Figure 1:
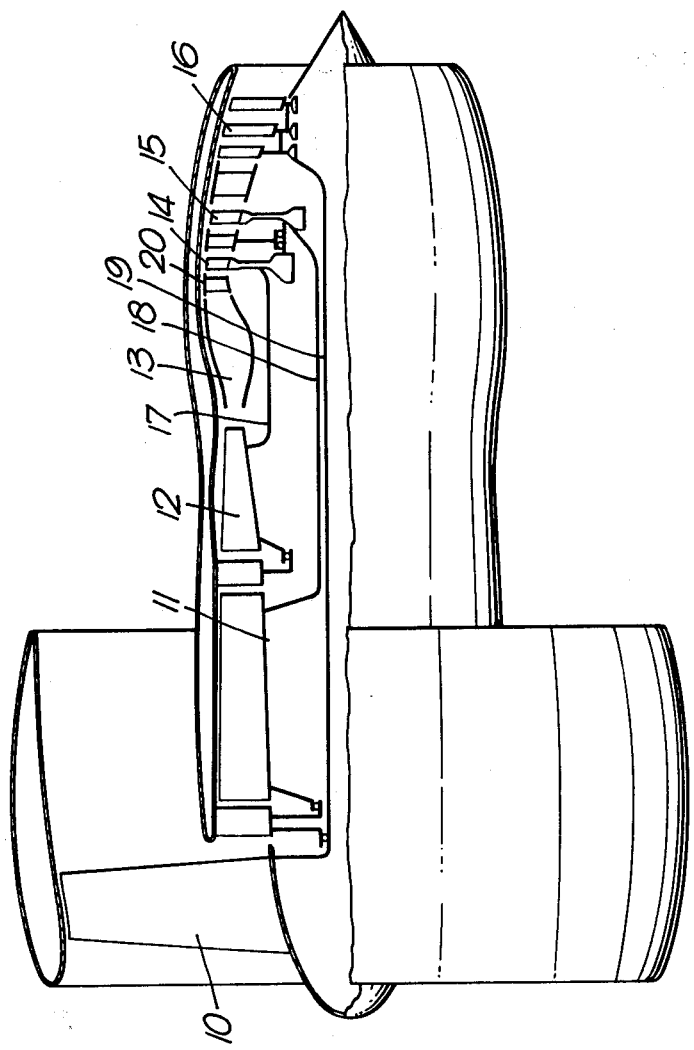

United States Patent [19]

Dodd

[11] Patent Number: 4,461,612
[45] Date of Patent: Jul. 24, 1984

[54] AEROFOIL FOR A GAS TURBINE ENGINE

[75] Inventor: Alec G. Dodd, Derby, England

[73] Assignee: Rolls-Royce Limited, London, England

[21] Appl. No.: 486,521

[22] Filed: Apr. 19, 1983

[30] Foreign Application Priority Data

Apr. 27, 1982 [GB] United Kingdom ............ 8212168

[51] Int. Cl.³ .............................................. F01D 5/18
[52] U.S. Cl. .............................. 416/96 A; 416/97 R; 415/115
[58] Field of Search ............. 416/96 A, 92, 97 R; 415/115

[56] References Cited

U.S. PATENT DOCUMENTS 3,930,748  1/1976  Redman et al. ................. 416/97
4,063,851 12/1977  Weldon ........................ 415/115 X
4,257,734  3/1981  Guy et al. ................... 416/96 A X
4,403,917  9/1983  Laffitte et al. .............. 415/115 X

FOREIGN PATENT DOCUMENTS 1467483  3/1977  United Kingdom ............ 416/96 A

Primary Examiner—Stephen Marcus
Assistant Examiner—Joseph M. Pitko
Attorney, Agent, or Firm—Cushman, Darby & Cushman

[57] ABSTRACT

An aerofoil, particularly a nozzle guide vane, for a gas turbine engine comprises a hollow interior with an air guide tube located therein. The air guide tube has apertures therein, and in order to cause the free edges of the apertures to seal against internal ribs of the aerofoil, springs are provided to force the open edges apart. Conveniently the springs comprise straps between the apertures which are formed with a corrugated shape.

3 Claims, 4 Drawing Figures

AEROFOIL FOR A GAS TURBINE ENGINE

This invention relates to an aerofoil for a gas turbine engine, and in particular to an aerofoil provided with internal cooling arrangements.

It has been common practice in the past to provide such an aerofoil with an internal air guide or air entry tube, which takes an incoming flow of cooling air and distributes it to various of the areas of the aerofoil wall. In particular, it has been the common practice to position such a tube in the leading edge portion of the aerofoil, and to provide the portion of the tube adjacent the leading edge with large apertures which enable virtually unrestricted flow of cooling air to the leading edge region. Such a construction is illustrated, for instance, in U.S. Pat. No. 3,799,696, issued Mar. 26, 1974 to Robert Frederick Redman, and assigned to the common assignee, Roll-Royce Limited, London, England.

One problem with such tubes lies in the control of the free edges of these large apertures. It is normally desirable to ensure that the area of tube adjacent to the apertures engages with features on the inner wall of the aerofoil, which may for instance be sealing lands. When the tube leading edge portion is weakened by the provision of the large apertures, it can be difficult to provide the necessary resilience of this part of the tube, this is especially the case when the tube is curved to match a modern aerofoil curved in the spanwise direction.

The present invention provides means for controlling the free edge of such apertures, which may also provide additional advantages.

According to the present invention, an aerofoil for a gas turbine engine comprises a hollow interior and an air guide tube located therein, at least one aperture in the tube, and a spring extending between the free edges of the aperture, said spring forcing the edges apart and into contact with an internal surface of the aerofoil interior.

The spring is preferably made by forming the portion of tube between adjacent apertures to produce a re-entrant shape.

Figure 2:
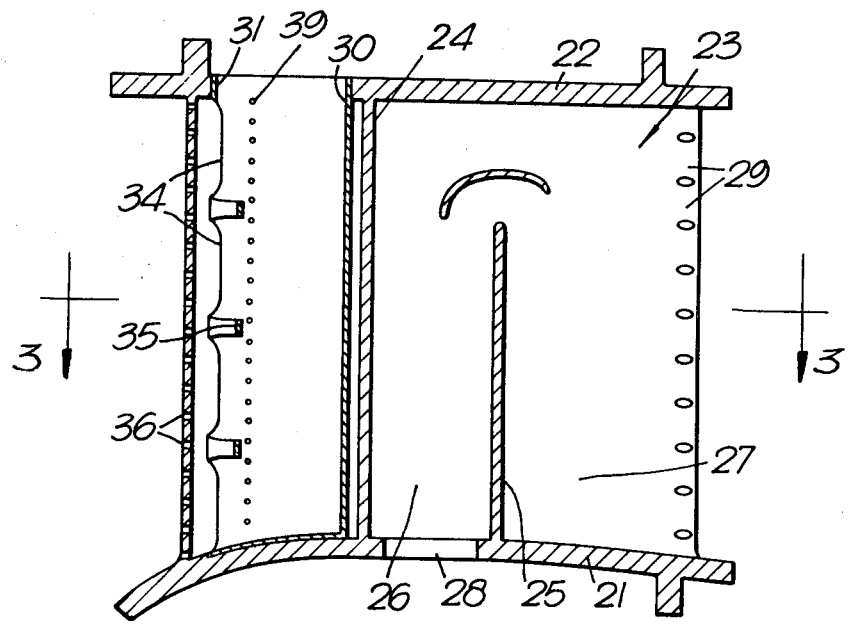
Figure 3:
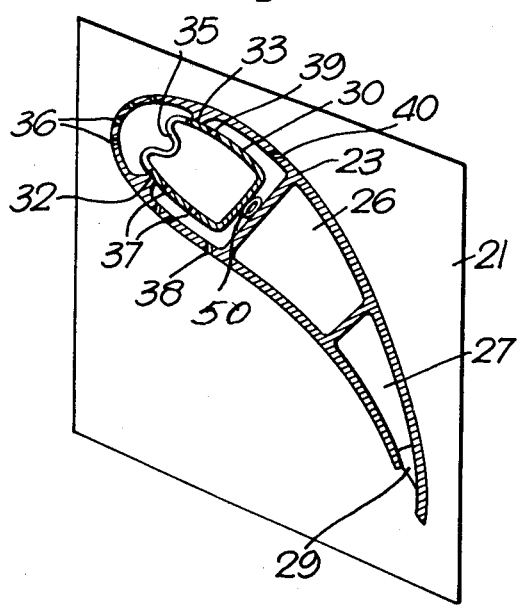
Figure 4:
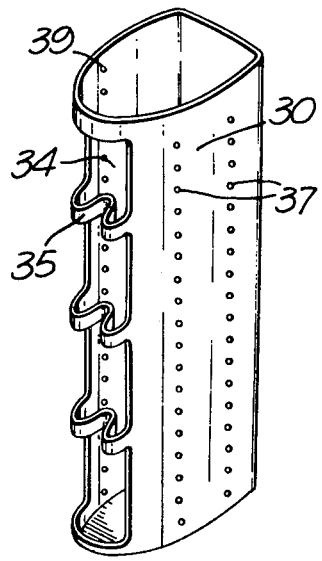

The invention will now be particularly described, merely by way of example, with reference to the accompanying drawings in which:

FIG. 1 is a partly broken-away view of a gas turbine engine having some aerofoils in accordance with the invention, FIG. 2 is an enlarged section on the mid-chord line of one of the vanes of FIG. 1 and in accordance with the invention, FIG. 3 is a section on the line 3—3 of FIG. 2, and FIG. 4 is a further enlarged perspective view of the air guide tube of FIGS. 2 and 3.

The engine shown in FIG. 1 is a generally conventional three-shaft front fan engine. It comprises a fan 10, intermediate and high pressure compressors 11 and 12, a combustion system 13 and high, intermediate and low pressure turbines 14, 15 and 16 respectively. The high pressure compressor 12 and turbine 14 are interconnected by a shaft 17, while shafts 18 and 19 interconnect the intermediate pressure compressor 11 and turbine 15, and the fan 10 and low pressure turbine 16 respectively.

Operation of the engine overall is conventional in that air is taken into the fan 10 and is compressed, part of the compressed air flowing into the intermediate pressure compressor 11 while the remainder provides propulsive thrust. That part of the airflow entering the compressor 11 is further compressed in the high-pressure compressor 12 and enters the combustion system 13, where it is mixed with fuel and burnt. The resulting hot gases pass through and drive the turbines 14, 15 and 16 in flow series and the spent gas then exhausts from the engine to provide additional thrust. The turbines drive their respective compressors via the respective one of the drive shafts 17, 18 and 19.

In order to direct the hot gases from the combustion chamber 13 on to the rotor blades of the turbine 14, an annular array of nozzle guide vanes 20 are provided. These vanes must withstand very high temperatures, and to enable them to do this they are provided with an air cooling system. The structure of the vanes which enables this air cooling is shown in more detail in FIGS. 2 and 3.

Thus each vane 20 comprises inner and outer platforms 21 and 22 mounted at the ends of an aerofoil 23 and defining, in conjunction with the corresponding platforms of the remainder of the vanes, the inner and outer boundaries of the gas flow path through the stage of vanes. The aerofoil 23 is hollow, and its hollow interior is divided by a wall 24 into forward and rearward systems. In the rearward section, between the wall 24 and the trailing edge of the vane, a division 25 extends spanwise of the vane to provide flow passages 26 and 27. These passages are interconnected adjacent the platform 22 where the division 25 stops short of the platform, and the passage 26 communicates with the opposite face of the platform 21 through an inlet aperture 28. The passage 22 in turn communicates with the exterior of the vane via slots 29 formed in the vane trailing edge.

Operation of this portion of the vane cooling system is quite simple and conventional in that cooling air flows from e.g. one of the compressors and enters the vane through the inlet apertures 28. The air then flows up the passage 26, between the end of the division 25 and the platform 22, and down the passage 27, exhausting from the aerofoil via the slots 29. In passing up and down the passages 26 and 27 the air provides convection cooling of this part of the vane, and if necessary rows of film cooling holes (not shown) may be provided to allow some cooling air to reach the exterior surface of the vane and thus to provide film cooling.

In the forward portion of the aerofoil a thin sheet metal air guide tube 30 is located. The tube 30 is closed at its end adjacent the platform 21 but is open at its other end which fits within an inlet aperture 31 formed in the platform 22. The tube 30 generally conforms in sectional shape to that of the interior of the forward section of the hollow aerofoil interior, and defines over the rearward part of its surface a small constant spacing from the interior of the aerofoil.

In order to support the tube 30 in position in the aerofoil, supporting and sealing ribs 32 and 33 are provided extending from the two flanks of the aerofoil adjacent the leading edges and a supporting and sealing resilient tube 50 extends spanwise of the blade in between the tube and the wall 24. The resilient tube 50 provides a load on the guide tube 30 pushing it forwardly and into contact with the ribs 32 and 33, however its action is assisted by the structure of the invention as will be described below.

At its leading edge and between the ribs 32 and 33, the tube 30 is entirely apertured. In the illustrated case four apertures 34 are provided, leaving three thin 'straps' 35 of metal between themselves, but it may be desirable to have three or even two apertures with corresponding numbers of straps.

As so far described this structure is fairly conventional, and will be seen to be similar to that disclosed in the aforementioned U.S. Pat. No. 3,799,696. Operation of its cooling arrangement is that cooling air enters the tube 30 via the inlet aperture 31, and is distributed to the various parts of the leading edge region of the aerofoil. Thus the large apertures 34 allow the full cooling air pressure to be fed to the leading edge region of the aerofoil, where it passes through arrays of film cooling holes 36 to film cool the leading edge surface.

A second proportion of the cooling air passes through apertures 37 in the wall of the tube 30 adjacent the concave, pressure flank of the aerofoil 23. This air impinges on the inner surface of the aerofoil to provide impingement cooling, then flows rearwardly to flow through film cooling holes 38 and thus to cool the rearward portion of the forward section of this flank. The seals provided by the rib 32 and tube 34 enable this part of the internal surface of the aerofoil to be isolated sufficiently to allow the pressure in this region to be correct for its particular usage.

The third proportion of the cooling air flows through a third set of holes 39 in the tube 30, and this air again impinges on the aerofoil to provide impingement cooling then flows rearwardly to pass through film cooling holes 40. In this way the convex, suction flank of the forward section of the aerofoil is cooled in a similar manner to the concave, pressure flanks. Again, the ribs 32 and 33 and tube 50 serve to isolate this region of the internal surface to enable the correct pressure to be achieved.

It will be seen that effective operation of the cooling system described depends upon the tube 30 sealing against the ribs 32 and 33 and the tube 50. Sealing against the tube 50 is relatively easily achieved since the resilience of the tube 50 allows for tolerances and distortions in the wall of the tube 30. However, the seal between the tube 30 and the ribs 32 and 33 is not so easy to achieve, particularly if the aerofoil is of complex shape.

In the illustrated embodiment, therefore, the straps 35 formed between adjacent apertures 34 are deformed to produce a corrugated shape, in the illustrated embodiment the straps are of 'W' shape having three corrugations.

This gives the straps a greater degree of resilience, and gives them the properties of springs, so that they may be used to force the free edges of the apertures apart to seal against the ribs 32 and 33. In addition to the simple degree of resilience involved, the corrugated formation enables the free edges to be forced outwardly without considerable edge twisting, therefore the edges maintain their shape and seal more easily against the ribs.

An additional benefit provided by the formation of the straps as indicated lies in the fact that the straps are moved away from the interior surface of the vane leading edge. The effect of the straps on the airflow through the film cooling holes 36 is therefore reduced because they are moved away from the holes.

It will be noted that the embodiment described above used the already existing straps between the apertures 34 to provide the springs which control the free edges of the apertures 34.

I claim:

1. A cooled vane or blade assembly for a gas turbine engine comprising:

an aerofoil-shaped member having a leading edge and a trailing edge, said aerofoil-shaped member having a hollow interior defined by convex suction and concave pressure flanks, a pair of interior opposed ribs extending from said flanks adjacent said leading edge, a partition extending spanwise between said flanks, said partition dividing said hollow interior into a forward portion and a rearward portion;

a unitary air guide tube positioned within and spaced from walls of said forward portion of said hollow interior of said aerofoil member and having a sectional shape generally corresponding to a sectional shape of said forward portion, said air guide tube having at least one elongated aperture opening towards said leading edge of said aerofoil-shaped member, said aperture being defined by spaced spanwise extending free edges and spaced chordwise extending integral corrugated spring portions, said integral corrugated spring portions having a resiliency tending to separate and urge said free edges into engagement with said ribs;

and resilient means positioned between said partition and said air guide tube for urging said air guide tube towards said leading edge of said aerofoil-shaped body member to a position where said free edges of said aperture are in engagement with said ribs against the resiliency of said integral corrugated spring portions.

2. A cooled vane or blade assembly as claimed in claim 1 in which said air guide tube has a plurality of spanwise spaced apertures, at least one of said apertures at one of the extremities of said air guide tube being defined by a corrugated spring portion and a plain portion of said guide tube, said plain portion being an end of said air guide tube.

3. A cooled vane or blade assembly as claimed in claim 1 in which all of the remaining apertures are each defined by a pair of free edges extending spanwise of said air guide tube and integral corrugated spring portions extending chordwise of said air guide tube.

* * * * *